United States Patent
Baughman et al.

(10) Patent No.: US 10,042,538 B2
(45) Date of Patent: Aug. 7, 2018

(54) ENUMERATION AND MODIFICATION OF COGNITIVE INTERFACE ELEMENTS IN AN AMBIENT COMPUTING ENVIRONMENT

(71) Applicant: INTERNATIONAL BUSINESS MACHINES CORPORATION, Armonk, NY (US)

(72) Inventors: Aaron K. Baughman, Silver Spring, MD (US); Rick A. Hamilton, II, Charlottesville, VA (US); James R. Kozloski, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 14/584,365

(22) Filed: Dec. 29, 2014

(65) Prior Publication Data
US 2016/0147423 A1    May 26, 2016

Related U.S. Application Data

(60) Provisional application No. 62/084,710, filed on Nov. 26, 2014.

(51) Int. Cl.
| G06F 3/01 | (2006.01) |
|---|---|
| G06F 3/0484 | (2013.01) |
| G06F 9/451 | (2018.01) |
| G06F 3/0482 | (2013.01) |
| G06F 9/44 | (2018.01) |
| G06F 3/048 | (2013.01) |
| G06F 3/00 | (2006.01) |

(52) U.S. Cl.
CPC .......... *G06F 3/04847* (2013.01); *G06F 3/048* (2013.01); *G06F 3/0482* (2013.01); *G06F 9/4443* (2013.01); *G06F 9/451* (2018.02)

(58) Field of Classification Search
None
See application file for complete search history.

(56) References Cited

U.S. PATENT DOCUMENTS

| 5,879,162 | A | 3/1999 | Bergman | |
|---|---|---|---|---|
| 6,973,626 | B1* | 12/2005 | Lahti | G06F 9/4443 715/744 |
| 7,146,626 | B1 | 12/2006 | Arsenault et al. | |
| 7,930,676 | B1 | 4/2011 | Thomas | |
| 9,448,692 | B1* | 9/2016 | Mierau | G06F 3/04817 |
| 2006/0056871 | A1 | 3/2006 | Kim | |
| 2006/0199167 | A1 | 9/2006 | Yang et al. | |
| 2009/0019535 | A1 | 1/2009 | Mishra et al. | |
| 2009/0271742 | A1* | 10/2009 | Zhang | G06F 9/4443 715/854 |

(Continued)

*Primary Examiner* — Toan Vu (74) *Attorney, Agent, or Firm* — Tutunjian & Bitetto, P.C.; Yeen C. Tham (57) ABSTRACT

A method and system are provided. The method includes cataloging a plurality of user interface elements belonging to a plurality of user interfaces on a plurality of devices included in an ambient computing environment. The method further includes estimating a current cognitive state of a user. The method also includes modifying at least one of the plurality of interface elements to align current cognitive demands of the ambient computing environment on the user with the current cognitive state of the user.

14 Claims, 7 Drawing Sheets

(56) References Cited

U.S. PATENT DOCUMENTS

| | | | | |
|---|---|---|---|---|
| 2010/0191554 A1* | 7/2010 | Singh | G06Q 10/063 705/7.11 |
| 2010/0281408 A1* | 11/2010 | Annett | G06F 3/04817 715/765 |
| 2010/0306048 A1 | 12/2010 | Corduneanu et al. | |
| 2010/0312638 A1 | 12/2010 | Jain et al. | |
| 2011/0105859 A1 | 5/2011 | Popovic et al. | |
| 2011/0283189 A1* | 11/2011 | McCarty | H04N 5/44543 715/707 |
| 2012/0011437 A1* | 1/2012 | James | G06F 1/1643 715/702 |
| 2012/0185420 A1* | 7/2012 | Lappalainen | G06F 3/011 706/14 |
| 2012/0226993 A1* | 9/2012 | Bromer | G06F 3/011 715/744 |
| 2013/0190093 A1* | 7/2013 | Wohlstadter | G06F 3/011 463/39 |
| 2013/0266918 A1 | 10/2013 | Tinjust | |
| 2014/0007010 A1* | 1/2014 | Blom | G06F 3/011 715/825 |
| 2014/0068492 A1* | 3/2014 | Yu | G06F 3/04886 715/773 |
| 2014/0164516 A1* | 6/2014 | Maltbie | H04L 67/06 709/204 |
| 2014/0335487 A1* | 11/2014 | Hinman | G09B 19/00 434/236 |
| 2015/0026647 A1* | 1/2015 | Park | G06F 3/0488 715/863 |
| 2015/0067495 A1* | 3/2015 | Bernstein | G06F 3/016 715/702 |
| 2015/0127215 A1* | 5/2015 | Chatterjee | H04W 4/001 701/36 |
| 2015/0143221 A1* | 5/2015 | Ahuja | G06F 17/241 715/230 |
| 2015/0257681 A1* | 9/2015 | Shuster | A61B 5/1123 600/301 |
| 2015/0382071 A1* | 12/2015 | Aravamudan | H04N 21/4856 725/14 |
| 2016/0005320 A1* | 1/2016 | deCharms | G09B 5/065 434/236 |
| 2016/0007849 A1* | 1/2016 | Krueger | A61B 3/113 600/301 |
| 2016/0131905 A1* | 5/2016 | Takahashi | G02B 27/0176 345/8 |
| 2016/0203726 A1 | 7/2016 | Hibbs et al. | |
| 2017/0123492 A1* | 5/2017 | Marggraff | G06F 3/013 |

* cited by examiner

ENUMERATION AND MODIFICATION OF COGNITIVE INTERFACE ELEMENTS IN AN AMBIENT COMPUTING ENVIRONMENT

BACKGROUND

Technical Field

The present invention relates generally to cognitive and contextual computing and, in particular, to the enumeration and modification of cognitive interface elements in an ambient computing environment.

Description of the Related Art

Adaptive user interfaces assume that a user is interacting only with the device providing the interface. Today, users face multiple interfaces into multiple devices, each competing independently for limited attention related and cognitive resources. As cognitive computing environments emerge and systems become more pervasive and ambient, a need exists to streamline this interface experience.

SUMMARY

According to an aspect of the present principles, a method is provided. The method includes cataloging a plurality of user interface elements belonging to a plurality of user interfaces on a plurality of devices included in an ambient computing environment. The method further includes estimating a current cognitive state of a user. The method also includes modifying at least one of the plurality of interface elements to align current cognitive demands of the ambient computing environment on the user with the current cognitive state of the user.

According to another aspect of the present principles, a computer program product is provided for cognitive interface modification. The computer program product includes a computer readable storage medium having program instructions embodied therewith. The program instructions are executable by a computer to cause the computer to perform a method. The method includes cataloging, by a user interface element manager of the computer, a plurality of user interface elements belonging to a plurality of user interfaces on a plurality of devices comprised in an ambient computing environment. The method further includes estimating, by a user cognitive state estimator of the computer, a current cognitive state of a user. The method also includes modifying, by a global user interface modifier of the computer, at least one of the plurality of interface elements to align current cognitive demands of the ambient computing environment on the user with the current cognitive state of the user.

According to yet another aspect of the present principles, a system is provided. The system includes a user interface element manager for cataloging a plurality of user interface elements belonging to a plurality of user interfaces on a plurality of devices comprised in an ambient computing environment. The system further includes a user cognitive state estimator for estimating a current cognitive state of a user. The system also includes a global user interface modifier for modifying at least one of the plurality of interface elements to align current cognitive demands of the ambient computing environment on the user with the current cognitive state of the user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to enumeration and modification of cognitive interface elements in an ambient computing environment.

In an embodiment, a system and method are described which simplify interfaces to one or more devices, including mobile and other devices in physical proximity, depending on a user's state. In an embodiment, the present principles advantageously reduce options available to a user during times of impaired cognitive capacity of the user and increase options available to a user during times of heighted cognitive capacity of the user.

In an embodiment, information regarding interfaces to one or more devices is enumerated continually or periodically through a set of standard machine-to-machine interfaces. This enumeration information from across devices is then provided to a cognitive load estimator and global user interface modifier which control the entire environment, based on a consistent understanding of the user's state. The system includes a user interaction device for determining the user's interaction with the environment. The features of a cognitive state are provided to the cognitive load estimator while the environment and the user's interaction within the environment are provided to the global user interface modifier. In some embodiments, a forecasted cognitive state, environment, and user's interaction within the environment queue potential transitional user interfaces over time.

Figure 1:
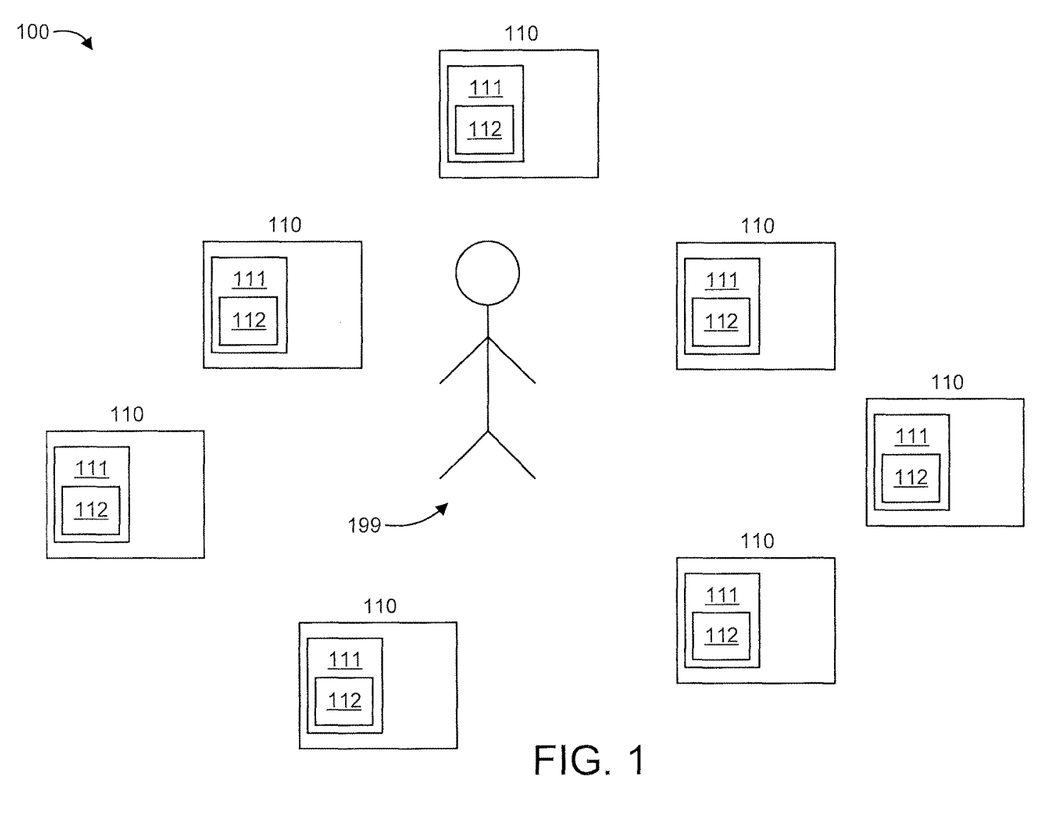
FIG. 1 shows an exemplary ambient computing environment 100 to which the present principles can be applied, in accordance with an embodiment of the present principles.

FIG. 1 shows an exemplary ambient computing environment 100 to which the present principles can be applied, in accordance with an embodiment of the present principles.

The ambient computing environment 100 includes a set of devices 110 having respective user interfaces 111 thereon for a user 199 to interact with the devices. The user interfaces 111 each include a set of user interface elements 112. The user interface elements 112 can be any portion of a user interface and/or any characteristics of any portion of a user interface. Examples of user interface elements are provided throughout herein.

The set of devices 110 can include any type of electronic device suitable for implementing the present principles, as readily recognized by one of ordinary skill in the art given the teachings of the present principles provided herein. As examples, such the set of devices can include any of, but is not limited to, televisions, mobile phones, videoconference devices, smart watches, computers, laptops, tablet, personal digital assistants, radios, stereos, multimedia players, appliances (refrigerator, stove, etc.), and so forth. As noted, the preceding listing is merely illustrative.

Figure 2:
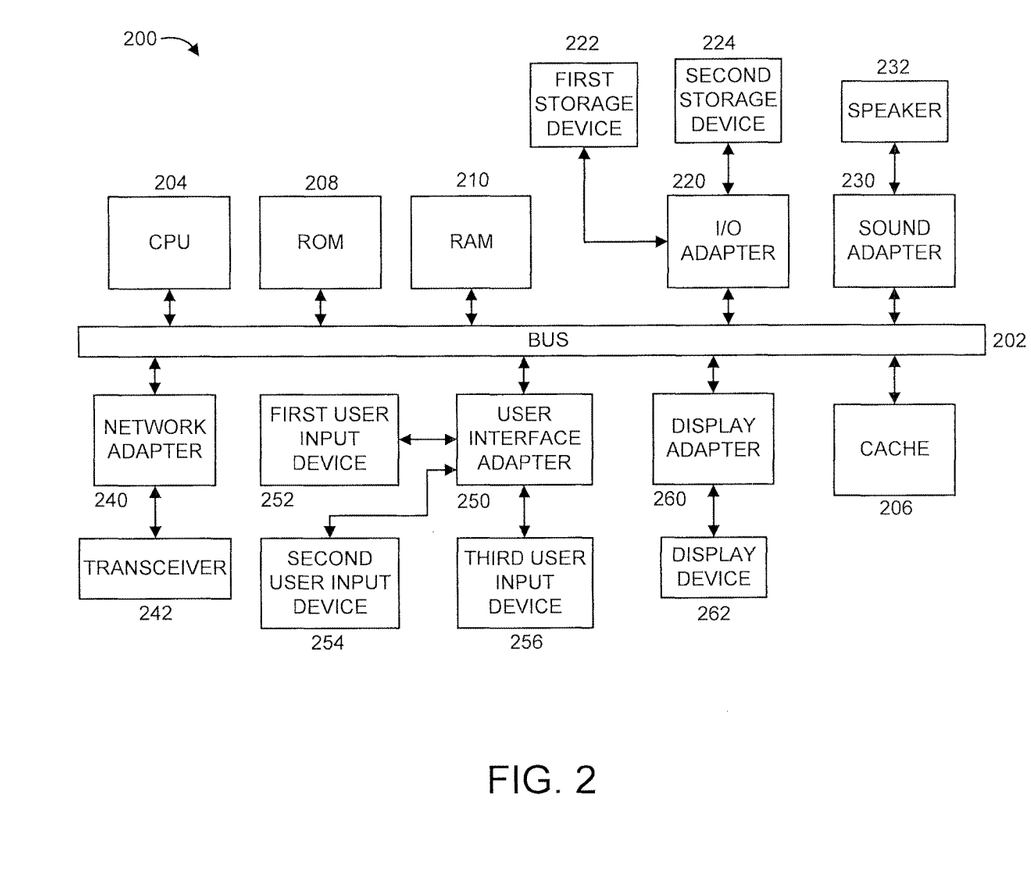
FIG. 2 shows an exemplary processing system 200 to which the present principles may be applied, in accordance with an embodiment of the present principles.

FIG. 2 shows an exemplary processing system 200 to which the present principles may be applied, in accordance with an embodiment of the present principles. The processing system 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third user input device 256 are operatively coupled to system bus 202 by user interface adapter 150. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 3:
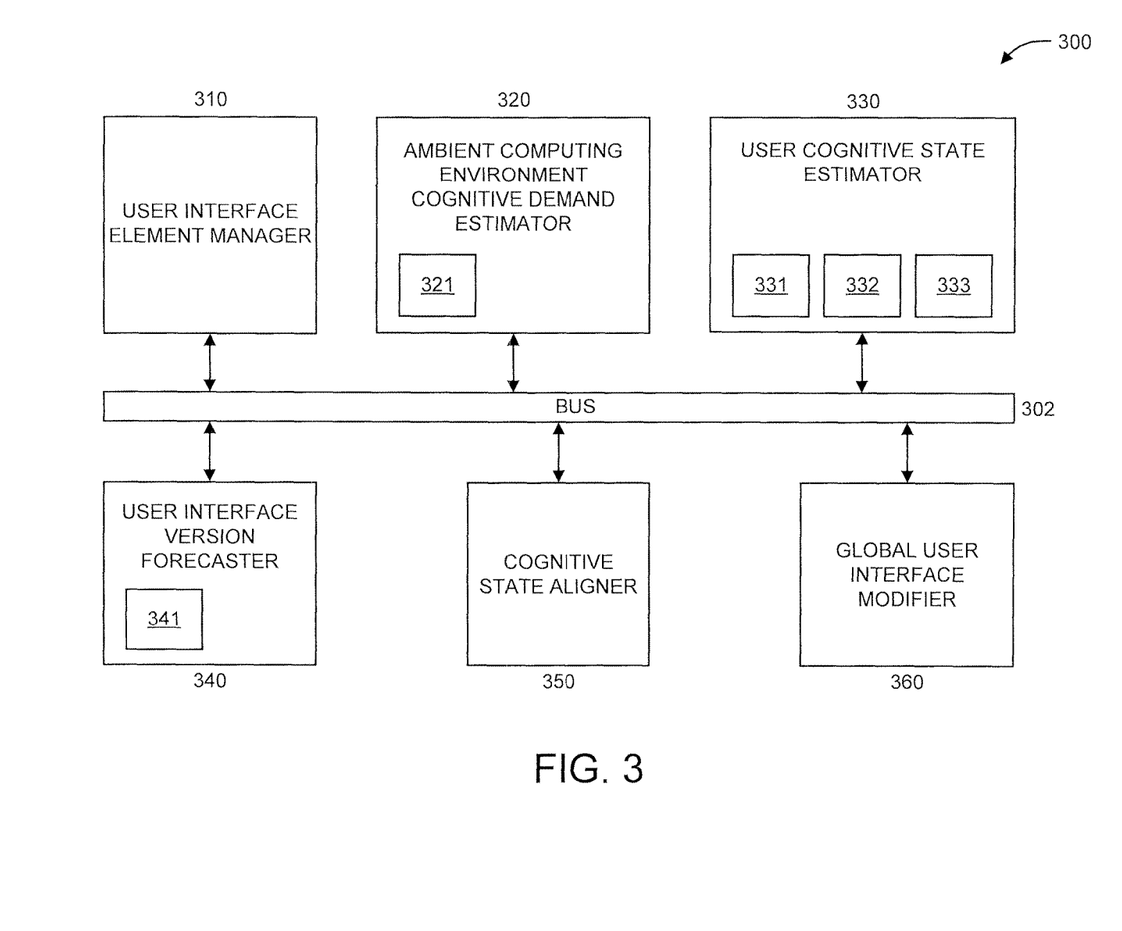
FIG. 3 shows an exemplary system 300 for enumeration and modification of cognitive interface elements in an ambient computing environment, in accordance with an embodiment of the present principles.

Moreover, it is to be appreciated that system 300 described below with respect to FIG. 3 is a system for implementing respective embodiments of the present principles. Part or all of processing system 200 may be implemented in one or more of the elements of system 300.

Figure 4:
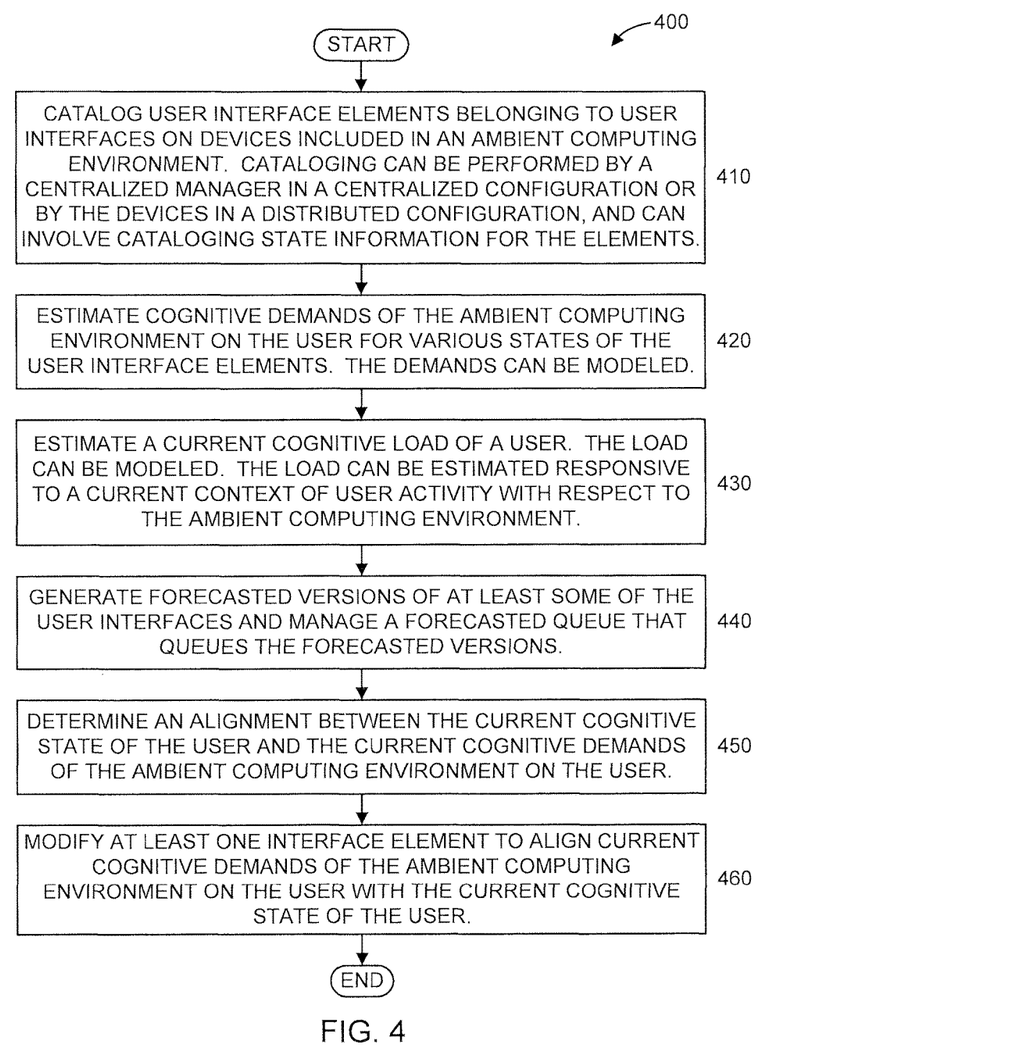
FIG. 4 shows an exemplary method 400 for enumeration and modification of cognitive interface elements in an ambient computing environment, in accordance with an embodiment of the present principles.

Further, it is to be appreciated that processing system 200 may perform at least part of the method described herein including, for example, at least part of method 400 of FIG. 4. Similarly, part or all of system 300 may be used to perform at least part of method 400 of FIG. 4.

FIG. 3 shows an exemplary system 300 for enumeration and modification of cognitive interface elements in an ambient computing environment, in accordance with an embodiment of the present principles. The ambient computing environment (e.g., environment 100) includes devices (e.g., devices 110) which, in turn, include user interfaces (e.g., user interfaces 111) which, in turn, include user interface elements. The system 300 includes a user interface element manager 310, an ambient computing environment cognitive demand estimator 320, a user cognitive state estimator 330, a user interface version forecaster 340, a cognitive state aligner 350, and a global user interface modifier 360.

The user interface element manager 310 catalogs the user interface elements. In an embodiment, the user interface element manager 310 is implemented in a distributed configuration so as to reside in each of the devices in the ambient computing environment. In such a case, the devices maintain their own respective catalogs of the user interface elements and information pertaining thereto. Thus, while directly coupled to the bus 302 in system 300, in another embodiment, the user interface element manager 310 can be implemented on each device and simply communicate with the other elements of system 300 via any connection means. In another embodiment, the user interface element manager 310 is implemented in a centralized configuration so as to receive user interface element information from the devices that include the user interface elements and manage a centralized catalog of the user interface elements and user interface element information.

The ambient computing environment cognitive demand estimator 320 estimates cognitive demands of the ambient computing environment on the user for various states of the user interface elements. As used herein, the term "cognitive demands of the ambient computing environment on the user" refers to a system that maps interface elements to cognitive demands, through a parameterizable model of a user's state. Specifically, for each interface, a set of specific model parameters are provided to the model over time, such as content topic, interface volume, rate of visual motion in content, etc. The user model is updated by these changing parameters, and by other parameters provided by the environment, user wearable devices, etc. The updated user model then computes an affinity of the user for each interface, and a cost the model will incur if each affinity is maintained. Costs may be estimated based on a decrease in a scarce model resource, such as attentional resource, short term memory maintenance, emotional tone, etc. These estimates of the cost of maintained affinities are then transformed by the cognitive demand estimator into an estimate of the "current cognitive demands of the ambient computing environment on the user" for a given interface. In an embodiment, the ambient computing environment cognitive demand estimator 320 includes an ambient computing environment cognitive demand model generator 321 for generating a model of the cognitive demands of the ambient computing environment on the user.

The user cognitive state estimator 330 estimates the cognitive state of the user. As used herein, the term "cognitive state of the user" refers to the current state of the user model, its affinities, and estimates of affinity maintenance costs. The model may include dynamical elements to model these quantities, or may be represented as a simple look up table from input parameters to affinities and affinity maintenance costs. The user cognitive state estimator 330 can include a user cognitive state model generator 331 for generating a model of the user's current cognitive state. The model generator 331 can also update the model as necessary responsive to changes in the user's cognitive state. The user cognitive state estimator 330 can include a user activity context determination device 332 that determines a current context of user activity with respect to the ambient computing environment. The user activity context determination device 332 can include various sensors including, but not limited to, a camera, a keystroke logger, a microphone, and so forth. The user cognitive state estimator 330 can include a user cognitive state forecaster 333 for generating various forecasts of the user's cognitive state. Hence, in an embodiment, a user cognitive state forecast can be used in place of or in addition to a user cognitive state estimation. Moreover, an estimate and/or a forecast of user cognitive state can be based on the user activity context.

The user interface version forecaster 340 determines forecasted versions of at least some of the user interfaces (hereinafter also "forecasted user interface versions"), and manages a forecasted queue 341 that queues the forecasted versions.

The cognitive state aligner 350 determines an alignment between the current cognitive state of the user and the current cognitive demands of the ambient computing environment on the user.

The global user interface modifier 360 modifies at least one user interface element to align the current cognitive state of the user with the current cognitive demands of the ambient computing environment on the user.

Hence, the system 300 quantifies computing interface elements across one or more devices present in a user's environment, and manages the computing interface elements as a single cognitive interface. Such a single cognitive interface can include one or more virtual or physical interfaces, sharing a unified knowledge of the cognitive state. Thus, the present principles are directed to and exploit a shared "knowledge" of user state which allows systems to coordinate their interfaces accordingly. Management includes modeling the user's current cognitive state and relating it to the attention and cognitive demands of the environment.

In the embodiment shown in FIG. 3, the elements thereof are interconnected by a bus 302. However, in other embodiments, other types of connections can also be used. Moreover, while some elements of FIG. 3 are shown as part of other elements (e.g., element 321 is part of element 320), in other embodiment, these included elements can be implemented as stand-alone elements. Moreover, in an embodiment, at least one of the elements of system 300 is processor-based. These and other variations of the elements of system 300 are readily contemplated by one of ordinary skill in the art given the teachings of the present principles provided herein, while maintaining the spirit of the present principles.

FIG. 4 shows an exemplary method 400 for enumeration and modification of cognitive interface elements in an ambient computing environment, in accordance with an embodiment of the present principles.

At step 410, catalog user interface elements belonging to user interfaces on devices included in an ambient computing environment. In an embodiment, the cataloging can involve state information for various states of the user interface elements. The cataloging can be performed by the devices and/or by a centralized manager. Hence, in an embodiment, step 410 can involve sharing, among the devices, the state information provided from corresponding ones of the devices that include the set of user interface elements. Moreover, in an embodiment, step 410 can involve receiving, by a centralized manager, the state information from corresponding ones of the set of devices that include the plurality of user interface elements. The state information can include, but is not limited to: inputs; outputs; features; options; availability, and so forth.

At step 420, estimate cognitive demands of the ambient computing environment on the user for various states of the user interface elements. In an embodiment, step 420 can involve generating a model of the cognitive demands of the ambient computing environment on the user for various states of the user interface elements.

At step 430, estimate a current cognitive state of a user. In an embodiment, step 430 can involve generating a model and/or forecast of the current cognitive state of the user. In an embodiment, the current cognitive state of the user can be estimated and/or forecasted responsive to a current context of user activity with respect to the ambient computing environment.

At step 440, generate forecasted versions of at least some of the user interfaces (hereinafter also "forecasted user interface versions") and manage a forecasted queue that queues the forecasted versions. In an embodiment, the forecasted versions can have one or more user interface elements therein modified to influence the current cognitive state of the user. In an embodiment, the forecasted versions can be determined from one or more of the following: the current cognitive state of the user; past cognitive states of the user; the current cognitive demands of the ambient computing environment on the user; past cognitive demands of the ambient computing environment on the user; and so forth.

At step 450, determine an alignment between the current cognitive state of the user and the current cognitive demands of the ambient computing environment on the user. The alignment is determined in relation to modifying one or more of the user interface elements. In this way, the current cognitive demands of the ambient computing environment on the user coincide with the current cognitive state and, hence, cognitive capacity, of the user. Thus, in an embodiment, the cognitive demands of the ambient computing environment on the user are adjusted by modifying one or more interface elements so as to make such cognitive demands be as close as possible to the current cognitive state of the user. Various examples of such an alignment are presented herein. In an embodiment, the alignment can be determined based on the model (of the current cognitive state of the user) generated by step 410 and/or the model (of the cognitive demands of the ambient computing environment on the user) generated by step 420. In an embodiment, the alignment can be determined based on the state information obtained by step 410.

At step 460, modify at least one interface element to align current cognitive demands of the ambient computing environment on the user with the current cognitive state of the user. In an embodiment, the at least one interface element can be modified responsive to the alignment determined by step 450. In an embodiment, the at least one interface element can be modified based on the model (of the current cognitive state of the user) generated by step 410 and/or the model (of the cognitive demands of the ambient computing environment on the user) generated by step 420. In an embodiment, the at least one interface element is modified to form a single cognitive-responsive interface to interface with the devices. In an embodiment, the single cognitive-responsive interface includes at least one of, one or more physical interfaces and one or more virtual interfaces, all sharing a unified knowledge of the current cognitive state of the user.

Further relating to step 460, we note that the ambient computing environment includes user usable features (also interchangeably referred to herein as "user usable options"). Such user usable features can include, but are not limited to, applications, features of the applications, features of the devices, and so forth. The user usable features relate to the user interface elements. For example, in an embodiment, the user interface elements can include one or more of the user usable features as well as other user interface related items as readily appreciated by one of ordinary skill in the art, given the teachings of the present principles provided herein.

In an embodiment, step 450 can involve providing more of the user usable features to the user when the user is in a cognitively enhanced state and less of the user usable features to the user when the user is in a cognitively impaired state. Hence, modification of a user interface element can include, but is not limited to, activating the element, deactivating the element, highlighting the element, hiding the element, changing a characteristic (e.g., accessibility, etc.) of the element, and so forth.

Also relating to step 460, in an embodiment, the modification of the at least one user interface element can be implemented by selecting and/or otherwise activating one of the forecasted user interface versions.

Hereinafter, four exemplary scenarios to which the present principles can be applied are described. Of course, the present principles are not limited to solely the preceding scenarios and, thus, other scenarios to which the present principles can be applied are readily determined by one of ordinary skill in the art given the teachings of the present principles provided herein, while maintaining the spirit of the present principles. These exemplary scenarios demonstrate various alignments from among many possible alignments that can be performed in accordance with the teachings of the present principles, while maintaining the spirit of the present principles.

The first example will now be described. Early in the morning, as a user is just waking, he may be in a drowsy state as he reaches for his mobile telephone. The mobile device may offer only a limited set of application icons (e.g., browser, email, social networks, etc.) which conform to the applications he uses in such a just-waking state. At other times, in cognitively impaired states, the applications offered may vary depending on his current use of a desktop or videoconferencing facility, e.g., during work meetings, those applications offered may be only relevant to work or his current tasks.

The second example will now be described. At the same waking state, the user's television may be included in a single ambient interface which understands his current state, and simplifies the process of navigating between a few "frequently Watched" morning stations, depending on his current use of other computing resources such as handheld devices or room teleconferencing capabilities. His radio, tablet computer, and other display-based devices would likewise expand or contract available options and user interfaces in a way that provides a consistent experience based on perceived cognitive state.

The third example will now be described. A user begins reading a newspaper article on a tablet. The newspaper is very engaging, yet the user needs to walk to a store. While walking, the tablet becomes transparent except for the newspaper article text. The change in the UI was altered by the user's interaction within an environment. Note that in this example, changes of material state occur, thus altering the UI, based on other ambient features that are predictors of a change in the user cognitive state, i.e., detection through ambient light of being outdoors, or detection through accelerometers of constant walking.

The fourth example will now be described. A runner tracks her progress on a head-mounted, wearable display. The device predicts that the user is getting tired, and moves a user interface that was on the predicted queue into the foreground. The updated UI changes the display of miles run from a count to a countdown, and show's remaining tenths of miles as the runner approaches her goal. This has the effect of encouraging the runner to keep going to meet her goal.

It is to be appreciated that the options presented to the user may vary according to time-of-day, detected cognitive variances, and/or other factors modeled in a unified cognitive state predictor model of the user for a given ambient computing environment.

A description will now be given regarding a cognitive bus, in accordance with an embodiment of the present principles. As used herein, the term "cognitive bus" refers to an embodiment of the present principles that conveys to all devices the states of persons in a household/office. Consider the following example. It is the morning, and Joe is waking up. His state is captured, and his cell phone responds accordingly. This information is propagated over the "cognitive bus" so that the television and other devices likewise respond accordingly. Soon thereafter, Joe's wife wakes up, followed by each of their kids. In each case, the states are recorded, and each device "knows" how to interact with each of them given their relative cognitive states.

A description will now be given regarding various additional embodiments.

In an embodiment, the device changes its state from complex to simple based upon the user's cognitive state.

In an embodiment, the device shares information with other devices, so that detection by one may be echoed through as behavior by all devices.

In an embodiment, a cognitive bus can be used that propagates continual state changes for all parties, so that all devices in a given ecosystem can be responsive to the last measured state.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
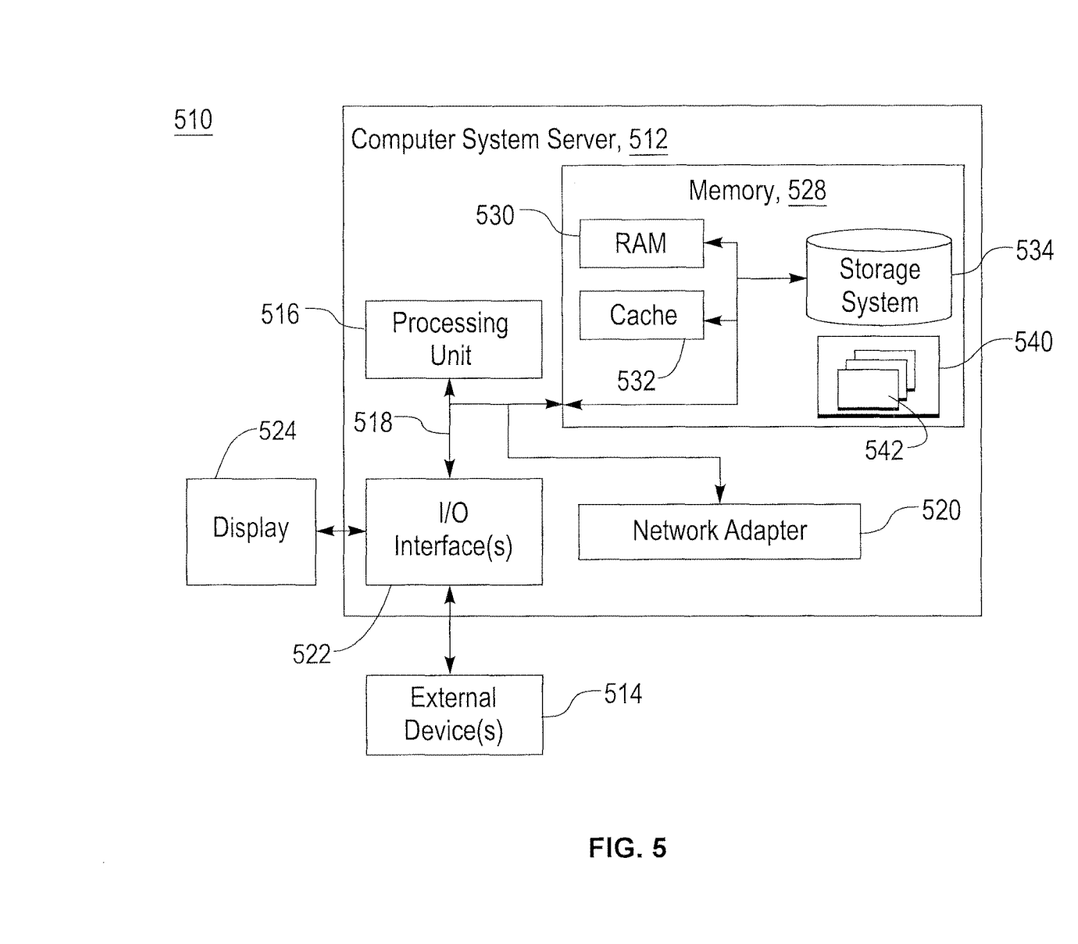
FIG. 5 shows an exemplary cloud computing node 510, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
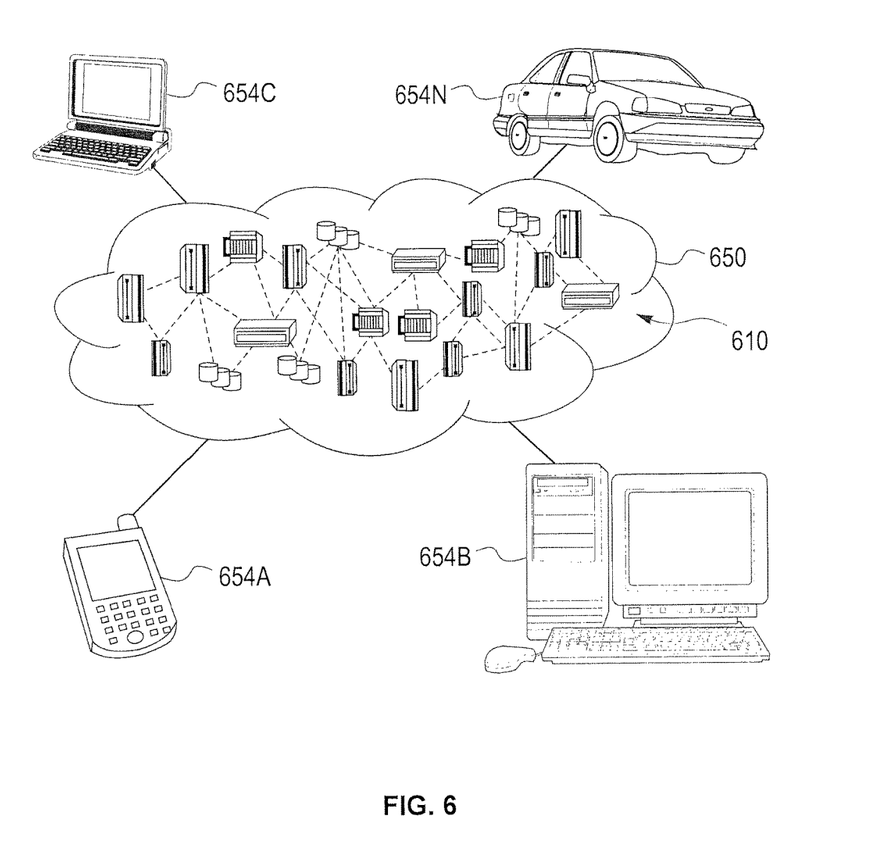
FIG. 6 shows an exemplary cloud computing environment 650, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
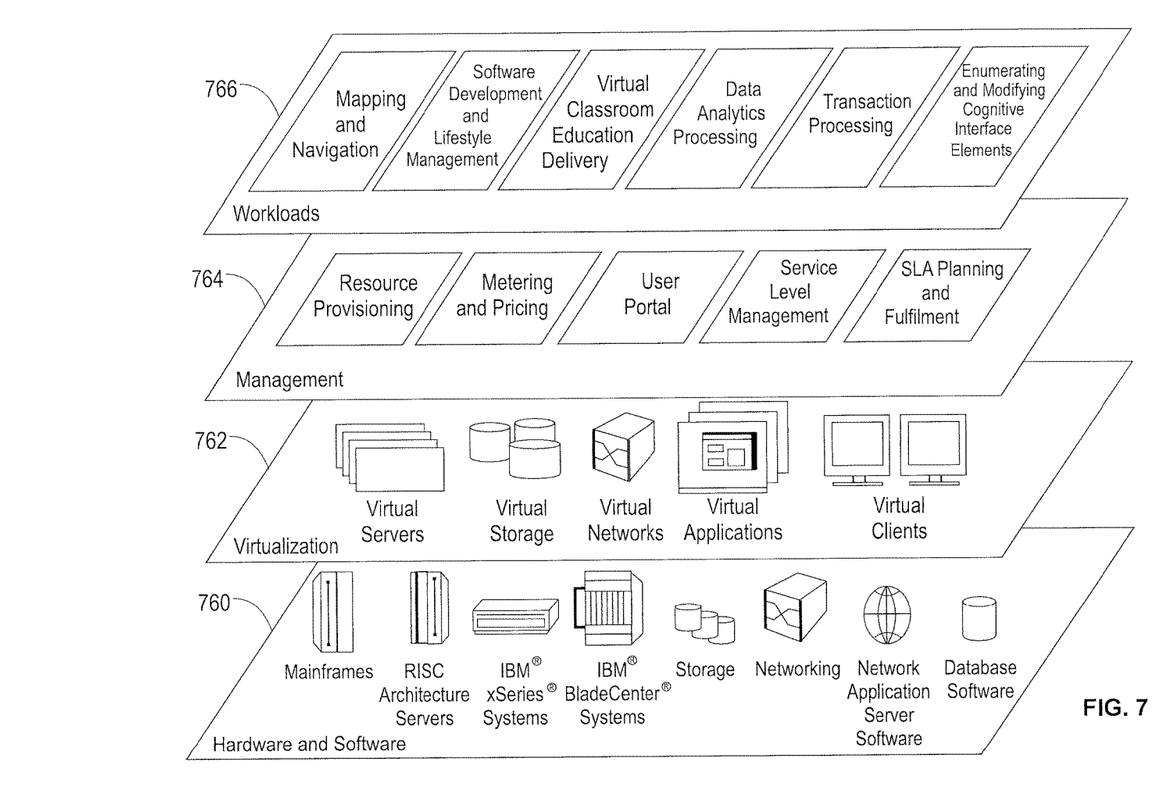
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and enumerating and modifying cognitive interface elements in an ambient computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for cognitive interface modification, the computer program product comprising a non-transitory computer readable storage medium having program instructions embodied therewith, the program instructions executable by a computer to cause the computer to perform a method comprising:
cataloging, by a processor of the computer, a plurality of user interface elements belonging to a plurality of user interfaces on a plurality of devices comprised in an ambient computing environment;
estimating, by the processor, a current cognitive state of a user based on an affinity of the user for each of the plurality of user interfaces and a model cost incurred to maintain the affinity of the user for each of the plurality of user interfaces; and
modifying, by the processor, at least one of the plurality of interface elements to align current cognitive demands of the ambient computing environment on the user with the current cognitive state of the user,
wherein the model cost incurred to maintain the affinity of the user for each of the plurality of user interfaces relates to a parameterizable and updateable model of the current cognitive state of the user, and
wherein parameters of the parameterizable model comprise a content topic, an interface volume, and a rate of visual motion in content.

2. A system, comprising:
a processor, configured to
catalog a plurality of user interface elements belonging to a plurality of user interfaces on a plurality of devices comprised in an ambient computing environment;
estimate a current cognitive state of a user based on an affinity of the user for each of the plurality of user interfaces and a model cost incurred to maintain the affinity of the user for each of the plurality of user interfaces; and
modify at least one of the plurality of interface elements to align current cognitive demands of the ambient computing environment on the user with the current cognitive state of the user,
wherein the model cost incurred to maintain the affinity of the user for each of the plurality of user interfaces relates to a parameterizable and updateable model of the current cognitive state of the user, and
wherein parameters of the parameterizable model comprise a content topic, an interface volume, and a rate of visual motion in content.

3. The system of claim 2, wherein the processor generates a model of the current cognitive state of the user and modifies the plurality of interface elements responsive to the model.

4. The system of claim 2, wherein the current cognitive state of the user is estimated in response to a current context of user activity with respect to the ambient computing environment.

5. The system of claim 2, wherein the at least one of the plurality of interface elements is modified to form a single cognitive-responsive interface to interface with the plurality of devices.

6. The system of claim 5, wherein the single cognitive-responsive interface comprises at least one of: one or more physical interfaces and one or more virtual interfaces, which share a unified knowledge of the current cognitive state of the user.

7. The system of claim 2, wherein the ambient computing environment comprises a plurality of user usable features, and wherein the processor provides more of the plurality of user usable features to the user when the user is in a cognitively enhanced state and less of the plurality of user usable features to the user when the user is in a cognitively impaired state.

8. The system of claim 2, wherein a user interface element software product executable by the processor is arranged in a centralized configuration and catalogs the plurality of user interface elements by receiving state information for various states of the plurality of user interface elements from corresponding ones of the plurality of devices that comprise the plurality of user interface elements, and wherein the current cognitive demands of the ambient computing environment on the user are determined based on the state information.

9. The system of claim 2, wherein a user interface element software product executable by the processor resides in each of the devices in a distributed configuration so as to share, among the plurality of devices, state information for various states of the plurality of user interface elements provided from corresponding ones of the plurality of devices that comprise the plurality of user interface elements, and wherein the current cognitive demands of the ambient computing environment on the user are determined based on the state information.

10. The system of claim 2, wherein the processor is further configured to determine forecasted versions of at least some of the plurality of user interfaces and manage a forecasted queue that queues the forecasted versions, the forecasted versions having one or more respective ones of the plurality of user interface elements therein modified to influence the current cognitive state of the user.

11. The system of claim 2, wherein the current cognitive state of the user is estimated to be tired.

12. The system of claim 2, wherein the at least one of the plurality of interface elements is modified by changing a display of a time that has elapsed while performing a physical task to a display of a time remaining to complete the physical task, responsive to the current cognitive state of the user being estimated to be tired.

13. The system of claim 2, wherein the model cost is estimated based on a decrease in a scarce model resource.

14. The system of claim 13, wherein the scarce model resource is selected from the group consisting of an attentional resource and a short term memory maintenance.

* * * * *